(12) United States Patent
Ciobota et al.

(10) Patent No.: US 11,905,949 B2
(45) Date of Patent: Feb. 20, 2024

(54) CONTROLLING PRESSURE ON A JOURNAL BEARING

(71) Applicant: Eaton Intelligent Power Limited, Dublin (IE)

(72) Inventors: Adrian Ciobota, Lakewood, OH (US); Martin Augustine Clements, Loveland, OH (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/873,958

(22) Filed: Jul. 26, 2022

(65) Prior Publication Data

US 2023/0033416 A1 Feb. 2, 2023

Related U.S. Application Data

(60) Provisional application No. 63/203,641, filed on Jul. 27, 2021.

(51) Int. Cl.
*F04C 15/00* (2006.01)
*F01C 21/02* (2006.01)
(Continued)

(52) U.S. Cl.
CPC .......... *F04C 15/0026* (2013.01); *F01C 21/02* (2013.01); *F04C 2/086* (2013.01);
(Continued)

(58) Field of Classification Search
CPC ........ F04C 2/18; F04C 2/086; F04C 15/0026; F04C 15/0042; F04C 15/0046; F04C 18/18; F04C 18/086; F04C 27/006; F04C 29/0021; F04C 29/0028; F04C 2240/10; F04C 2240/30; F04C 2240/56; F04C 15/0023; F04C 27/005; F01C 1/18; F01C 1/086; F01C 21/02; F01C 21/003; F01C 21/005; F01C 21/108; F01C 19/085; F01C 19/08; F16C 2360/00; F16C 17/026; F16C 17/045; F16C 17/102; F16C 17/107; F16C 33/1015; F16C 33/107

See application file for complete search history.

(56) References Cited

U.S. PATENT DOCUMENTS

2,624,287 A * 1/1953 Ilyin .................... F04C 15/0042
418/79
2,728,301 A * 12/1955 Lindberg ............ F04C 15/0061
418/73
(Continued)

*Primary Examiner* — Mark A Laurenzi
*Assistant Examiner* — Xiaoting Hu
(74) *Attorney, Agent, or Firm* — Merchant & Gould P.C.

(57) ABSTRACT

A groove is applied to one or more contact surfaces of a journal bearing of a pump to increase a force applied to the contact surface(s). Each groove has an end exposed to discharge pressure of the pump so that the groove communicates the discharge pressure across the contact surface. The groove reduces an area of the contact surface over which fluid leakage results in a pressure differential, thereby increasing a net force applied to the contact surface. Applying the groove to the axial end face of the journal bearing enhances an axial force applied to the journal bearing whereas applying the groove to a radially facing land reduces friction between the journal bearing and the outer housing.

12 Claims, 8 Drawing Sheets

(51) Int. Cl.
    *F04C 2/08*       (2006.01)
    *F04C 2/18*       (2006.01)
    *F16C 17/10*     (2006.01)

(52) U.S. Cl.
    CPC ............ *F04C 2/18* (2013.01); *F04C 15/0042* (2013.01); *F16C 17/107* (2013.01); *F04C 2240/56* (2013.01); *F16C 2360/00* (2013.01)

(56) References Cited

U.S. PATENT DOCUMENTS

| | | | | |
|---|---|---|---|---|
| 2,820,416 A * | 1/1958 | Compton | ................ | F04C 2/086 418/80 |
| 2,870,720 A * | 1/1959 | Lorenz | ................ | F04C 15/0026 418/102 |
| 2,997,960 A * | 8/1961 | Takehiko | ................ | F04C 2/086 418/206.7 |
| 3,008,426 A * | 11/1961 | Edwards | ................ | F02M 41/08 418/69 |
| 3,043,230 A * | 7/1962 | Hans | ................ | F04C 15/0042 D30/152 |
| 3,057,303 A * | 10/1962 | Lauck | ................ | F04C 15/0026 418/132 |
| 3,251,309 A * | 5/1966 | Schmiel | ................ | F04C 15/0026 418/149 |
| 4,090,820 A * | 5/1978 | Teruyama | ................ | F04C 15/0088 418/79 |
| 8,308,366 B2 | 11/2012 | Clements | | |
| 8,959,920 B2 | 2/2015 | Clements | | |
| 11,060,560 B2 | 7/2021 | Clements | | |
| 2005/0058566 A1 * | 3/2005 | Christensen | ................ | F04C 2/18 418/206.1 |
| 2012/0156080 A1 * | 6/2012 | Laetzel | ................ | F04C 15/0042 418/206.7 |
| 2018/0340471 A1 | 11/2018 | Nyzen et al. | | |
| 2020/0074409 A1 | 3/2020 | Liu et al. | | |
| 2021/0310485 A1 * | 10/2021 | Rigosi | ................ | F04C 2/102 |
| 2023/0014002 A1 * | 1/2023 | Rossi | ................ | F04C 2/084 |

\* cited by examiner

CONTROLLING PRESSURE ON A JOURNAL BEARING

CROSS-REFERENCE TO RELATED APPLICATIONS

This application claims the benefit of U.S. Provisional Patent Application No. 63/203,641, filed Jul. 27, 2021. The disclosure of the priority application in its entirety is hereby incorporated by reference into the presence application.

BACKGROUND

Fuel pumps may have various stages including a gear stage. Journal bearings are provided along one or more gear sets of the gear stage. The journal bearings radially support the gear sets within an outer housing. The journal bearings also axially support gears of the gear sets within the outer housing and provide at least some sealing against fluid leakage at the gears. To provide this sealing, a first axial force is applied to movable ones of the journal bearings to press the journal bearings towards the gears relative to the outer housing.

SUMMARY

Some aspects of the disclosure are directed to a journal bearing for a gear stage of a pump (e.g., a fuel pump). The journal bearing is configured to move axially along the journal relative to an outer housing. The journal bearing defines a groove communicating a discharge pressure along a bearing surface to reduce the surface area of the bearing surface over which a pressure gradient is produced. In particular, the surface area of the pressure gradient is limited to an area between the groove and a region in communication with inlet pressure. Accordingly, a greater portion of the bearing surface is consistently exposed to discharge pressure, which is higher than the inlet pressure.

In certain implementations, the groove is provided at the axial end face of the journal bearing that faces a gear of the gear stage. The axial end face is configured to bear against the gear. By limiting the pressure differential to only a region of the axial end face, discharge pressure is consistently applied to the remaining region of the axial end face to counteract a biasing force applied to the journal bearing to press the journal bearing against the gear. Because the discharge pressure applies a higher force than what would be applied by the pressure gradient, the groove increases the counter force applied to the axial end face.

In certain implementations, the groove is provided at a land facing radially outwardly towards an outer housing around the journal bearing. The journal bearing defines an outer channel that communicates a discharge pressure across a first circumferential section of the land. The discharge pressure applies a radial load on the journal bearing towards the outer housing. A second circumferential section of the land is exposed to inlet pressure. The groove is disposed at the second circumferential section of the land to counteract the radial load by allowing discharge pressure to be applied to at least a portion of the second circumferential section. The groove limits the surface area over which a pressure differential (and hence a reduced force) would extend. Counteracting the radial load applied to the first circumferential section may result in less friction between the second circumferential section and the outer housing, which facilitates axial movement of the journal bearing.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
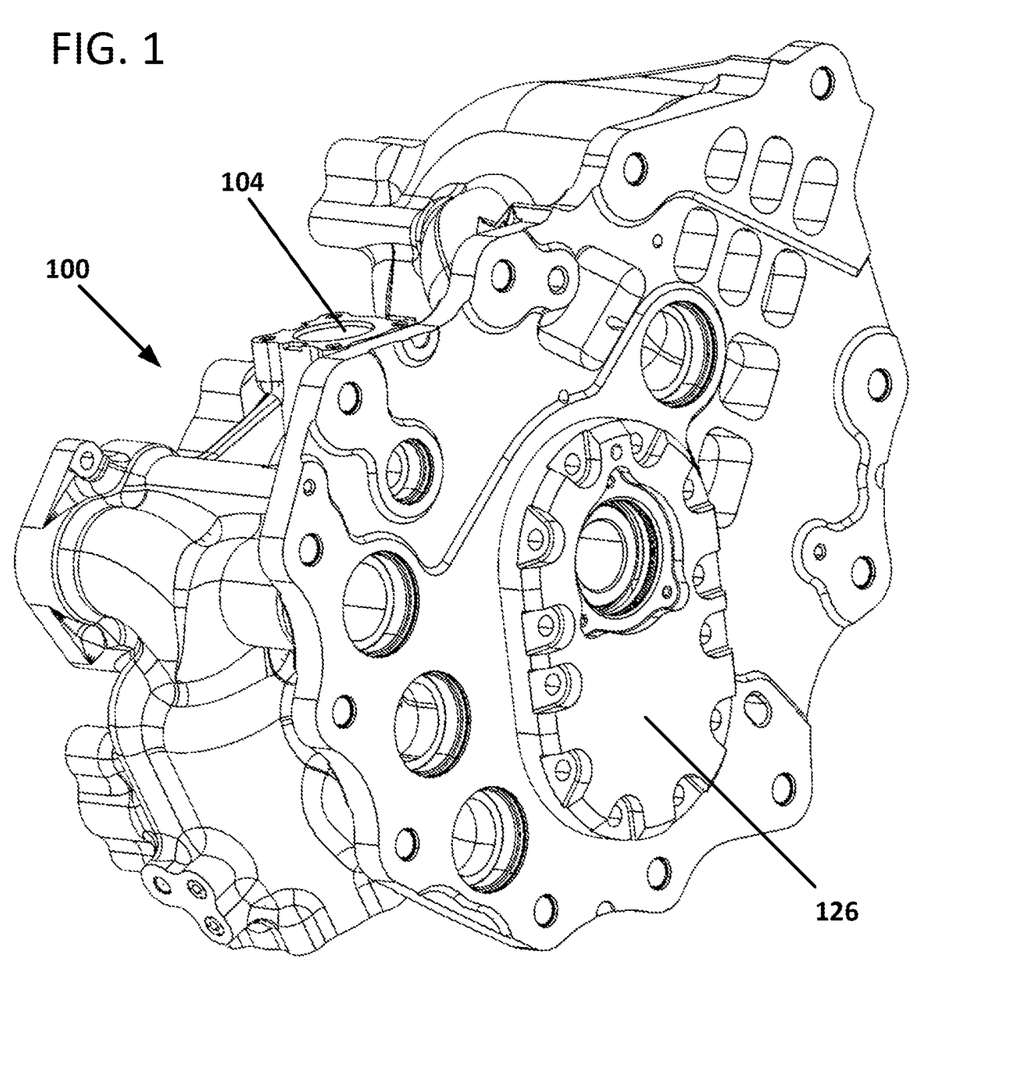
FIG. 1 is a perspective view of an example fuel pump including a gear stage configured in accordance with the principles of the present disclosure.
Figure 2:
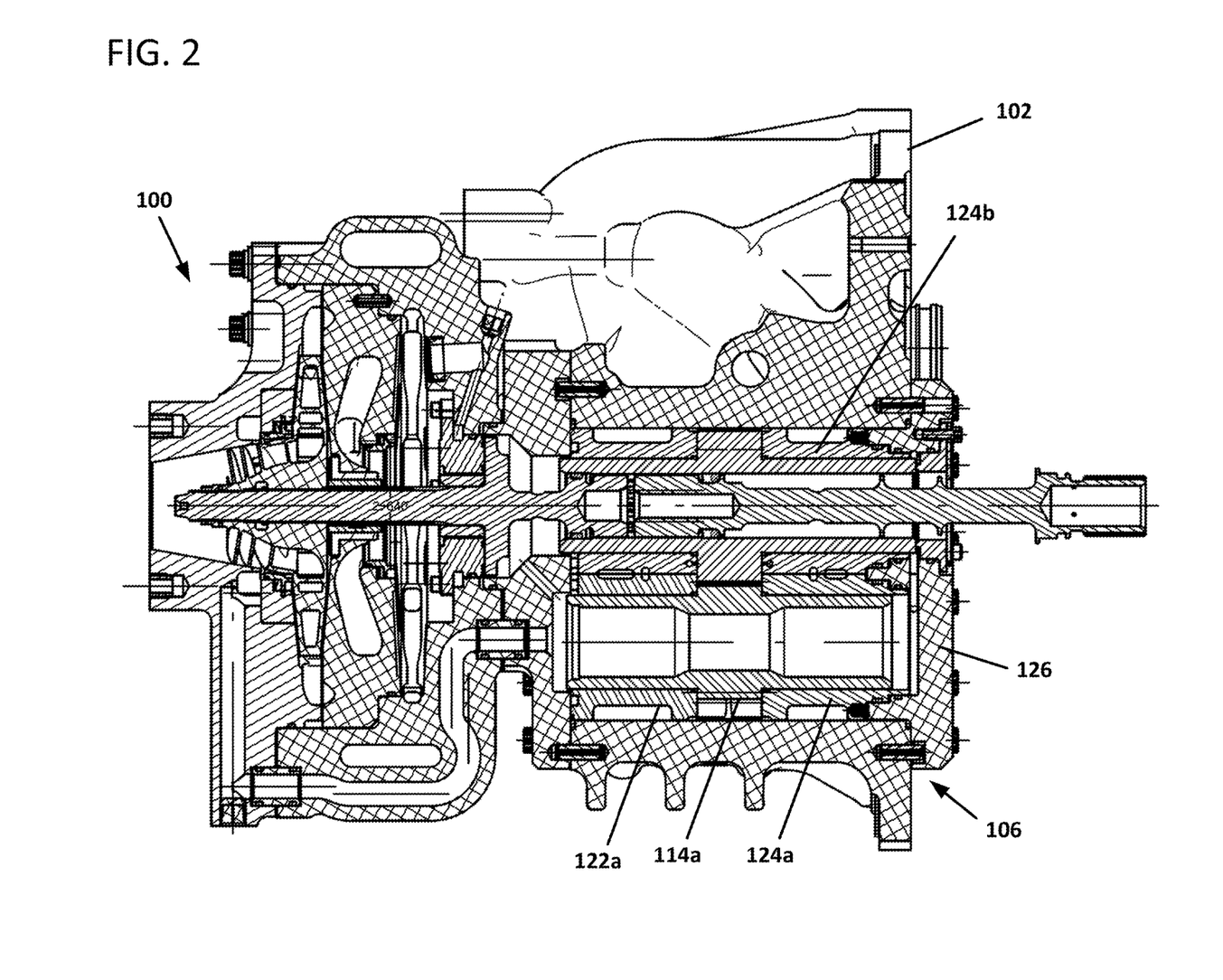
FIG. 2 is a longitudinal cross-section of the fuel pump of FIG. 1.

FIG. 1 illustrates a fuel pump 100 for use with an engine. The fuel pump 100 drives fluid (e.g., fuel) from an inlet 102 to an outlet 104 with one or more stages. For example, referring to FIGS. 2 and 3, the pump 100 includes a gear stage 106 having an outer housing 116 defining a gear chamber 118. The inlet 102 leads to an inlet region of the gear chamber 118; the outlet 104 leads to a discharge region 112 of the gear chamber 118. A gear arrangement 108 is disposed within the gear chamber 118 and drives fluid from the inlet region 110 to the discharge region 112.

Figure 4:
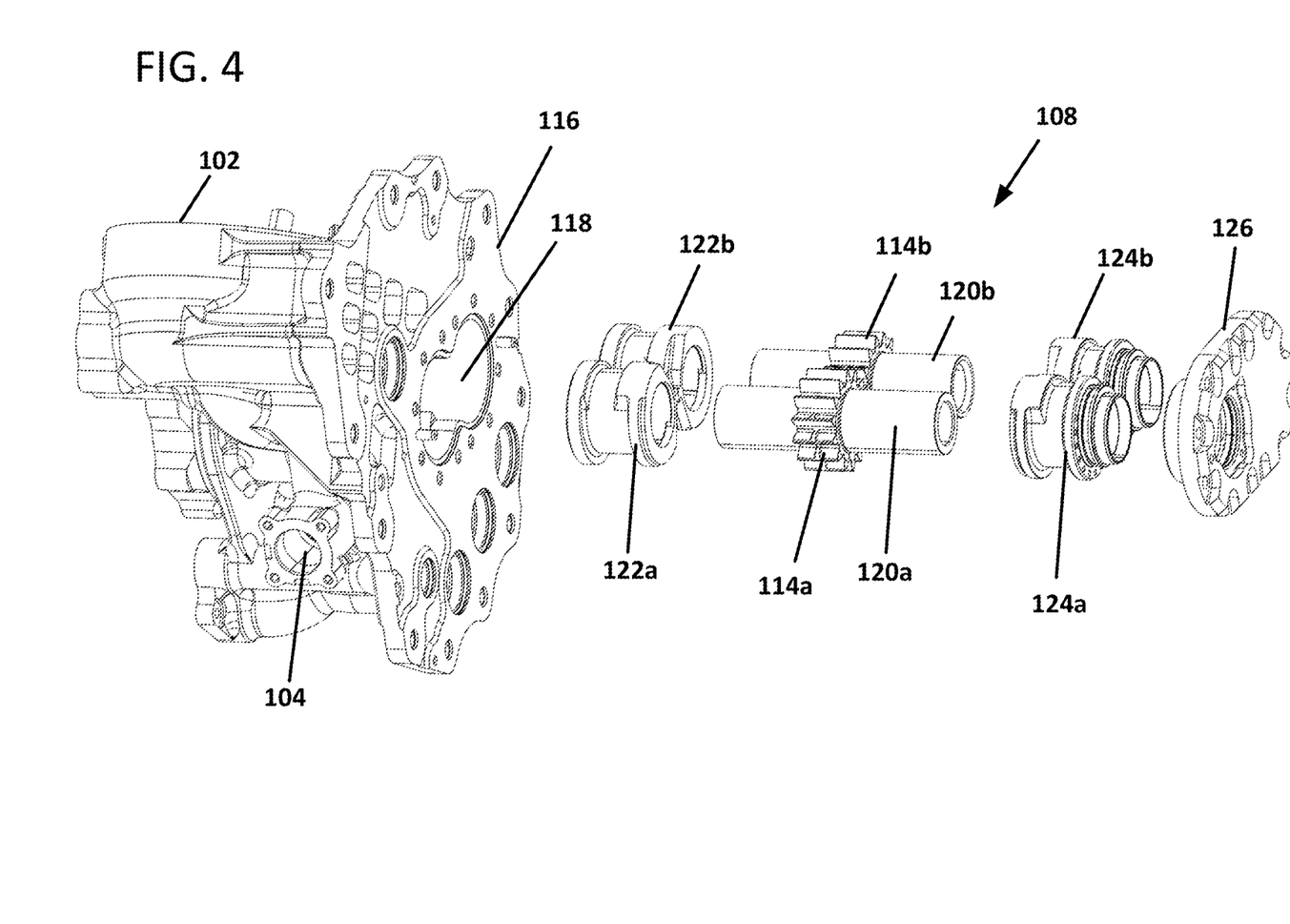
FIG. 4 shows components of the gear stage exploded outwardly from an outer housing of the fuel pump of FIG. 1.
Figure 5:
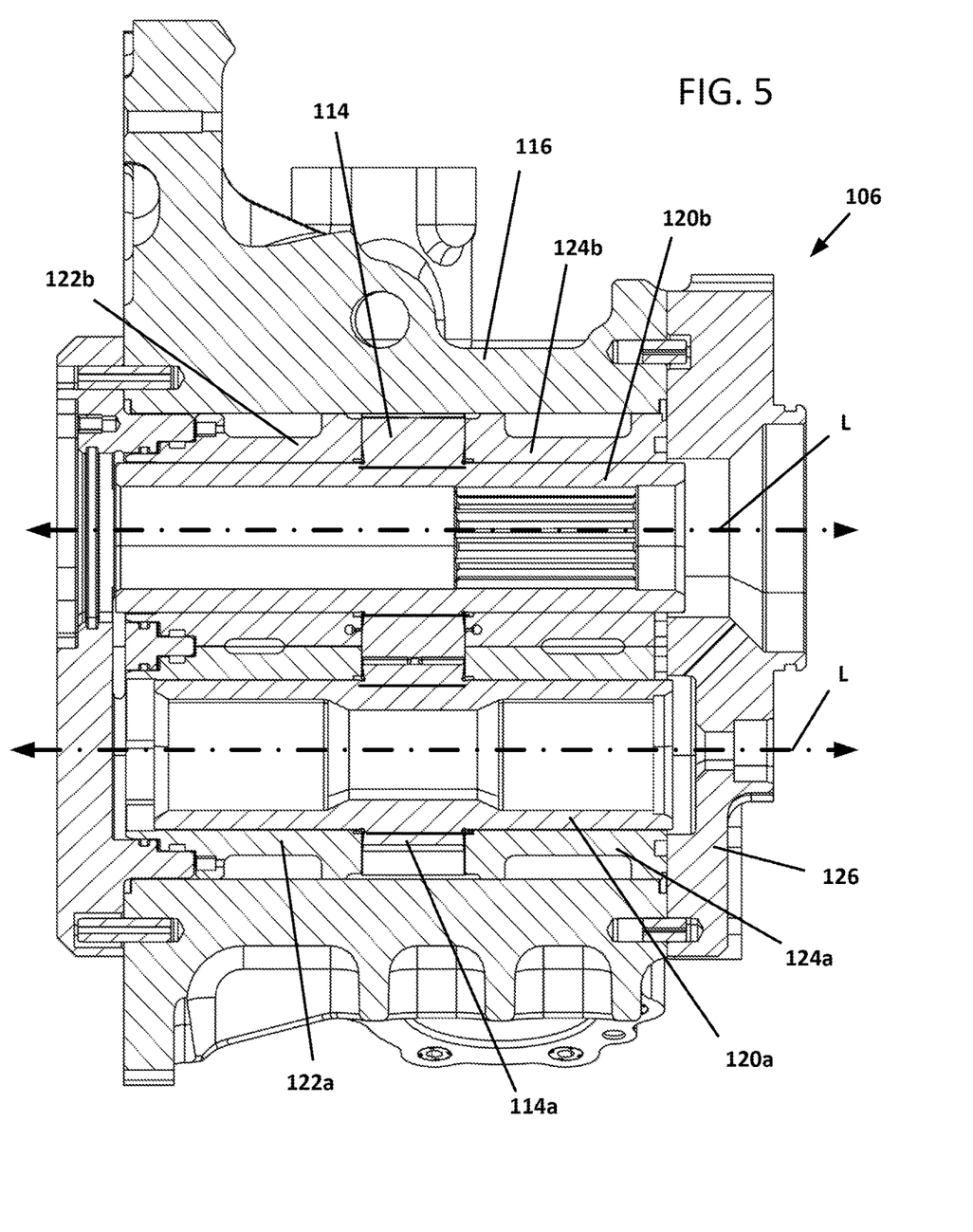
FIG. 5 is a longitudinal cross-section of the gear stage of the fuel pump of FIG. 1 including first and second gear sets, each gear set including a gear, a fixed bearing, and a movable bearing.

As shown in FIGS. 4 and 5, the gear chamber 118 extends along a longitudinal axis L. The gear arrangement 108 is disposed within the gear chamber 118. The gear arrangement 108 includes a first gear set including a journal 120 extending axially within the gear chamber 118 along the longitudinal axis L. A gear 114 of the first gear set is rotatably mounted over the journal 120. First and second bearings 122, 124 are mounted over the journal 120 at opposite sides of the gear 114 to radially support the journal 120 relative to the housing 116 such that the journal 120 is rotatable about the longitudinal axis L relative to the housing 116. The first and second bearings 122, 124 are rotationally fixed relative to each other and to the outer housing 116. An end cap 126 mounts to the housing 116 to close the gear chamber 118.

In certain implementations, the components are formed from different materials. For example, the gears 114a, 114b may be formed of a different metal than the movable bearings 124a, 124b and/or the housing 116. Accordingly, thermal variations have different effects on the components. To compensate, the second bearings 124a, 124b are axially movable along the journal to accommodate thermal expansion and contraction during operation of the pump 100. The first bearing 122 is both axially and rotationally fixed relative to the journal 120.

Figure 3:
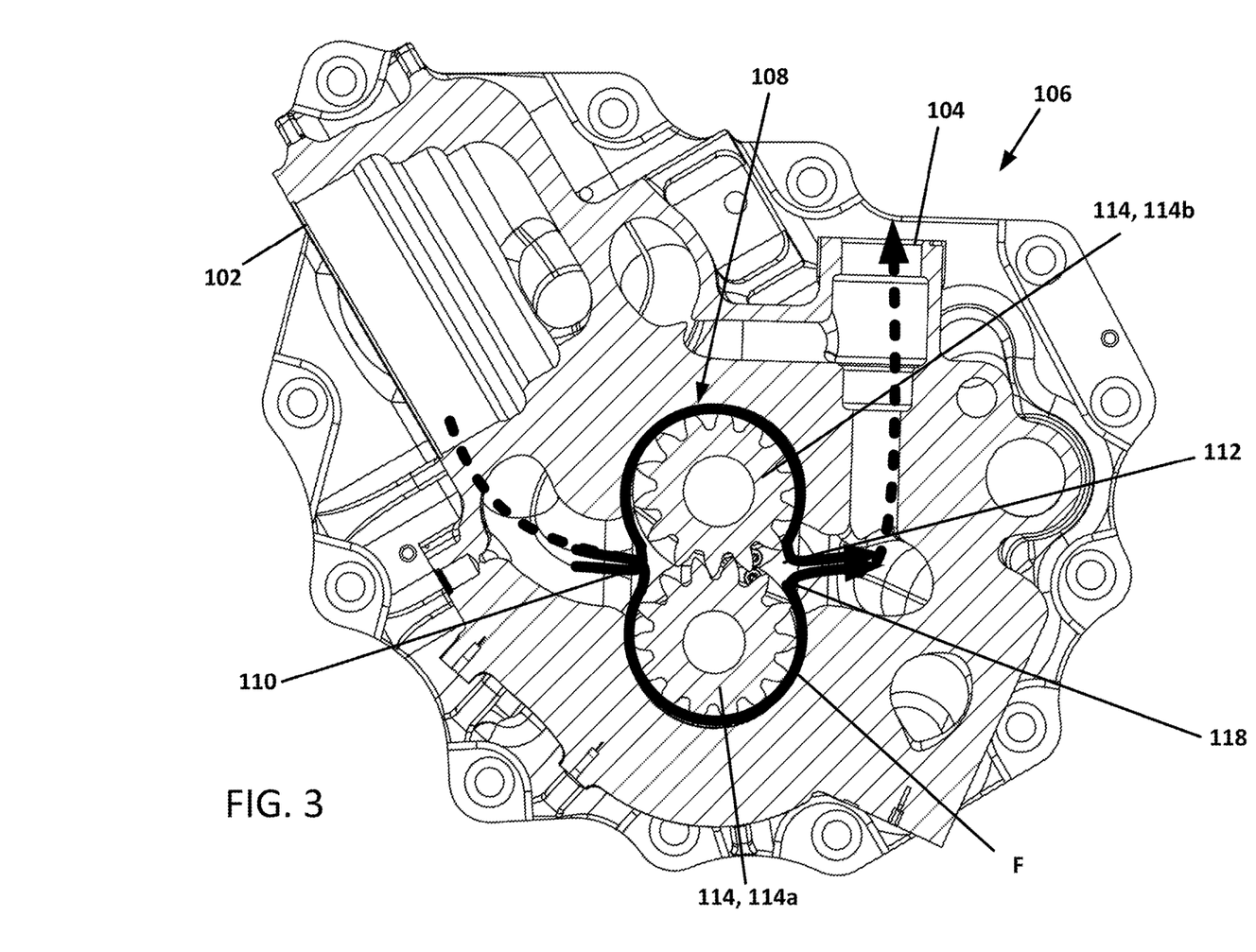
FIG. 3 is a transverse cross-section of the gear stage of the fuel pump of FIG. 1.

In certain implementations, the gear arrangement 108 includes two gear sets disposed in parallel within the gear chamber 118. Each of the first sets includes a respective gear 114a, 114b, a respective journal 120a, 120b extending along a respective longitudinal axis, a respective fixed bearing 122a, 122b, and a respective movable bearing 124a, 124b of the gear arrangement 108. The gear chamber 118 is shaped to accommodate both gear sets. In the example shown, the gear chamber 118 has a peanut shaped transverse cross-section. The gear sets are disposed sufficiently close together so that at least the second bearings 124a, 124b contact each other as will be described in more detail herein. As shown in FIG. 3, the first and second gears 114a, 114b mesh together at a region in alignment with the inlet region 110 and the discharge region 112. The teeth of the gears 114a, 114b draw fluid from the inlet region 110, along a flow path F extending between the gear teeth and the cavity 118, to the discharge region 112. While a majority of the fluid is driven to the outlet 104 through the discharge region 112, at least some of the fluid leaks along the gear chamber 118 (e.g., to the movable bearings 124a, 124b). Fluid leaking from the inlet region 110 has a first pressure. Fluid leaking from the discharge region 112 has a second pressure that is greater than the first pressure. To reduce leakage, the movable bearings 124a, 124b are biased against the respective gears 114a, 114b. Accordingly, each gear 114a, 114b is pressed between the fixed bearing 122a, 122b and the movable bearing 124a, 124b.

Figure 6:
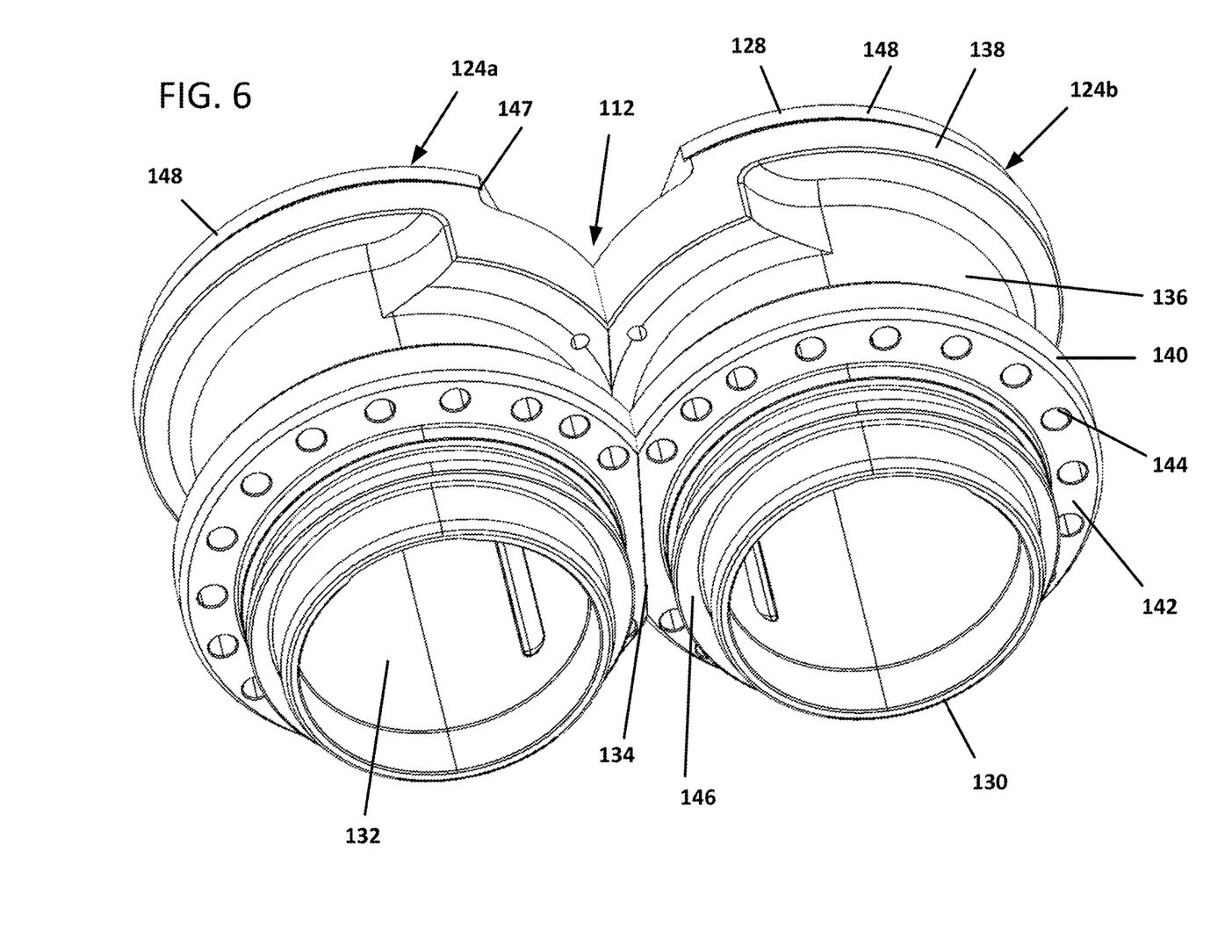
FIG. 6 illustrates the movable bearings of the first and second gear sets of FIGS. 4 and 5 disposed with flat sides touching.
Figure 7:
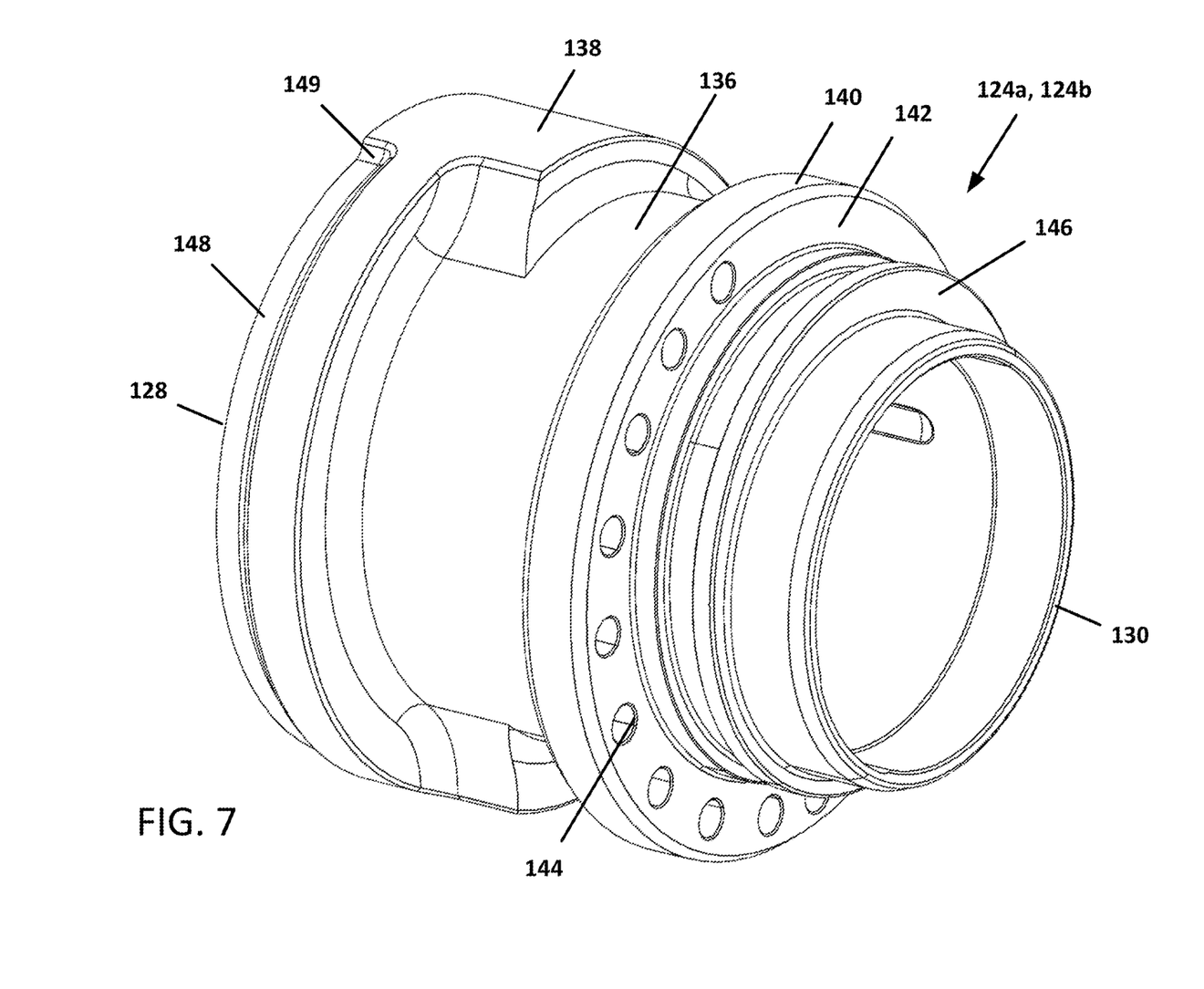
FIG. 7 is a perspective view of an example movable bearing suitable for use in one of the first and second gear sets, the movable bearing of the other gear set being a mirror image.
Figure 8:
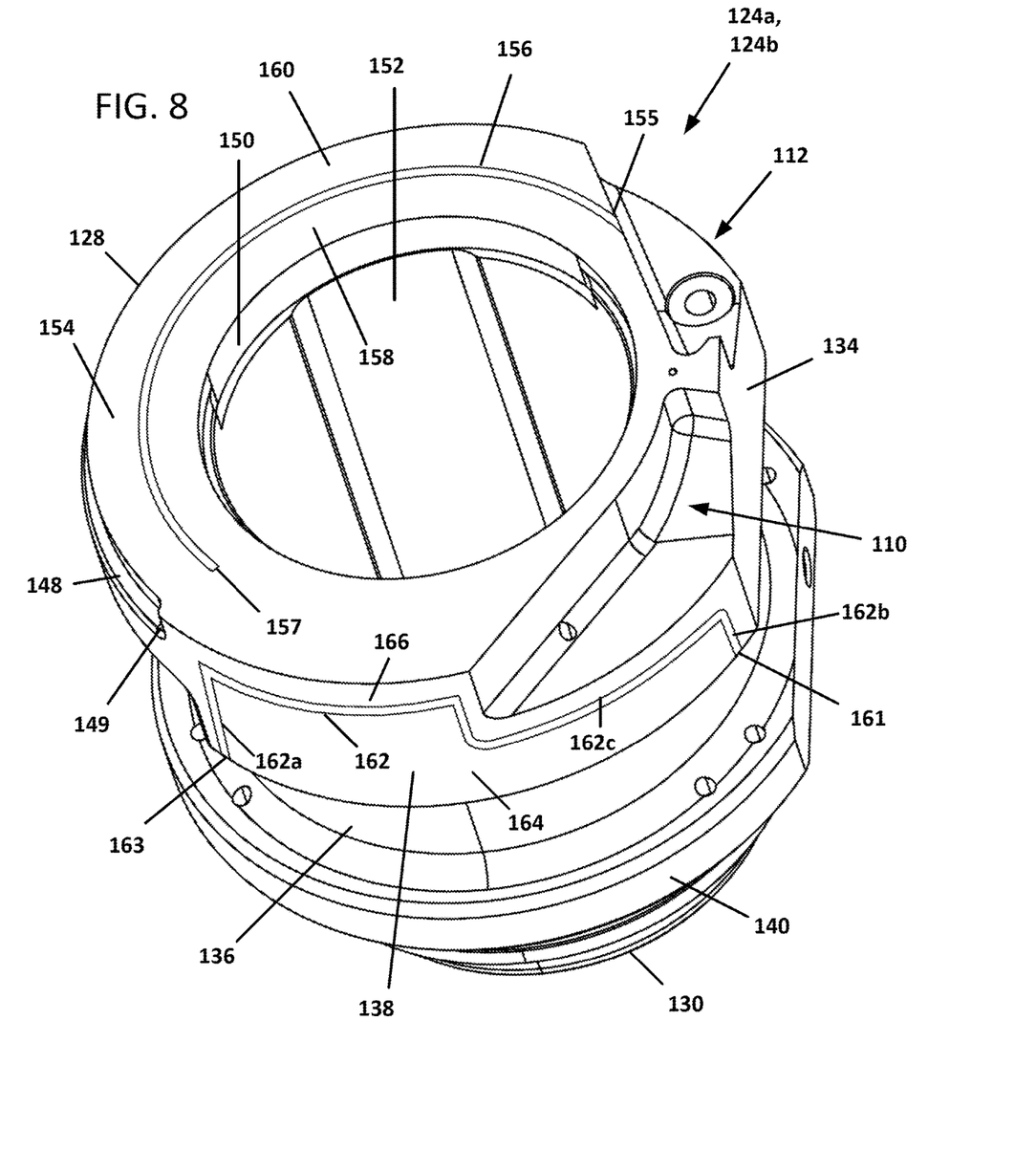
FIG. 8 is another perspective view of the movable bearing of FIG. 7 shown from the opposite axial end.

As shown in FIGS. 6-8, each movable bearing 124a, 124b defines a through-bore 132 for receiving the respective journal 120a, 120b. The through-bore 132 extends between a first axial end 128 and a second axial end 130 of the axially-movable bearing 124a, 124b. The first axial end 128 faces the axial side of the respective gear 114a, 114b and the second axial end 130 faces away from the respective gear 114a, 114b. Each movable bearing 124a, 124b defines flat surfaces 134 facing transverse to the longitudinal axis L. The flat surfaces 134 are configured to engage each other when the movable bearings 124a, 124b are mounted to the respective journals 120a, 120b within the gear chamber 118. Engagement of the flat surfaces 134 inhibits rotation of the movable bearings 124a, 124b about the journals 120a, 120b. The inlet region 110 is disposed at one side of the flat surfaces 134 and the discharge region 112 is disposed at the opposite side of the flat surfaces 134. The movable bearings 124a, 124b each include a circumferential portion surrounding the through-bore 132 and extending axially along the longitudinal axis L between the opposite ends 128, 130. The outer circumferential portion of each movable bearing 124a, 124b defines a drum 136 disposed axially between first and second lands 138, 140 that are configured to contact the housing 116. The drum 136 is recessed radially inwardly from the first and second lands 138, 140. The second land 140 of each movable bearing 124a, 124b defines a shoulder 142 facing towards the second axial end 130. The shoulder 142 may define one or more spring stops 144. An eccentric surface 146 also may be disposed at the second axial end 130 of each movable bearing 124a, 124b.

The movable bearings 124a, 124b each include a circumferential portion surrounding the through-bore 132 and extending axially along the longitudinal axis L between the opposite ends 128, 130. The outer circumferential portion of each movable bearing 124a, 124b defines a drum 136 disposed axially between first and second lands 138, 140 that are configured to contact the housing 116. The drum 136 is recessed radially inwardly from the first and second lands 138, 140. The second land 140 of each movable bearing 124a, 124b defines a shoulder 142 facing towards the second axial end 130. The shoulder 142 may define one or more spring stops 144. An eccentric surface 146 also may be disposed at the second axial end 130 of each movable bearing 124a, 124b.

Each movable bearing 124a, 124b defines an outer channel 148 extending circumferentially around a section of the outer circumferential portion at the first axial end 128. The outer channel 148 has a first end 147 in fluid pressure communication with the discharge region 112. The outer channel 148 extends circumferentially around the movable bearing 124a, 124b from the first end 147 to an opposite second end 149 that terminates before reaching the flat surface 134. Accordingly, the outer channel 148 provides discharge fluid pressure along the section of the outer circumferential portion at the first axial end 128. The drum 136 of each movable bearing 124a, 124b also is in fluid pressure communication with the discharge region 112. As shown in FIG. 8, the through-bore 132 of the axially-movable bearing 124a, 124b defines a counter-sunk channel 150 that is in fluid pressure communication with the inlet region 110 of the gear chamber 118 via an axial channel 152 along the through-bore 132.

A balance of forces are applied to each movable bearing 124a, 124b to press the movable bearing 124a, 124b against the respective gear 114a, 114b. For example, the second axial end 130 may be in fluid pressure communication with the discharge region 112 so that high fluid pressure presses against the eccentric surface 146 and/or against the shoulder 142 at the second axial end 130 of the movable bearing 124a, 124b. In certain examples, springs (e.g., coil springs) may be mounted at the second axial end 130 of the movable bearing 124a, 124b (e.g., at the spring stops 144) to bias the movable bearing 124a, 124b towards the respective gear 114a, 114b. An opposing force acts on the first axial end 128 of the movable bearing 124a, 124b. For example, fluid may leak from the discharge region 112 across the first axial end face of the movable bearing 124a, 124b. In addition, the metal-to-metal contact between the axial end face of the movable bearing 124a, 124b and the respective gear 114a, 114b counteracts the biasing force. Furthermore, friction between the movable bearing 124a, 124b and the outer housing 116 occurs along the first and second lands 128, 140.

FIG. 8 illustrates first and second grooves 156, 160 provided to control pressure gradients along contact surfaces (e.g., the axial end face 154 at the first axial end 128 and/or the first landing 138) of the movable bearing 124a, 124b. The first groove 156 reduces the surface area over which a pressure gradient extends at the axial end face 154. The second groove 156 reduces the surface area over which a pressure gradient extends along the first land 138.

The first groove 156 is defined in the axial end face 154 and extends circumferentially around the longitudinal axis L from a first end 155 to a second end 157. The first groove 156 is disposed radially outwardly from the bore 132 and radially inwardly from the outer perimeter of the axial end face 154. The first groove 156 divides the axial end face 154 into an inner region 158, which extends radially between the countersunk channel 150 and the first groove 156, and an outer region 160, which extends radially between the first groove 156 and the outer perimeter of the axial end face 154. The first end 155 opens to the discharge region 112 of the gear chamber 118. The second end 157 terminates within the axial end face 154. In certain examples, the first groove 156 extends along the same section as the outer channel 148 so that the second end 157 of the groove 156 is offset radially inwardly from the second end 149 of the outer channel 148. In certain implementations, the first groove 156 is disposed in line with the roots of the teeth of the respective gear 114a, 114b so that fluid pressure beneath the teeth of the gear 114a, 114b is relative constant (e.g., at discharge fluid pressure).

Discharge fluid flows along the first groove 156 from the first end 155 to the second end 157. As noted above, the countersunk channel 150 within the bore 132 is exposed to inlet fluid pressure while the outer channel 148 is exposed to discharge fluid pressure. Absent the first groove 156, fluid would leak across the first axial end face 154 from the countersunk channel 150 towards the outer channel 148, thereby resulting in a pressure gradient spanning the first axial end face 154. The addition of the first groove 156 confines the fluid leak, and hence the pressure gradient, to the inner region 158. The first groove 156 reduces a pressure gradient across the outer region 160. Fluid pressure does not vary greatly across the outer region 160 because the fluid pressure at the first groove 156 is the same as the fluid pressure at the outer channel 148. Maintaining the outer region 160 of the axial end face 154 at discharge pressure increases the amount of hydraulic pressure applied to the axial end face 154 to counteract the biasing force applied to the second axial end 130. Increasing the pressure at the first axial end 128 reduces the amount of metal-to-metal contact without changing the biasing force. Furthermore, such consistency enables the surface geometry of the axial end face 154—at least at the outer region 160—to be designed to accommodate other factors.

The second groove 162 is defined in the first landing 138 of the outer circumferential portion of the movable bearing 124a, 124b. In particular, the second groove 162 is disposed at a section of the first landing 138 close to the inlet region 110. The second groove 162 has a circumferential section that divides the first land 138 into a first axial region 164 adjacent the drum 136 and a second axial region 166 adjacent the inlet pressure region 110. The second groove 162 extends from a first end 161 to a second end 163. Both of the first and second ends 161, 163 are open to the drum 136 and, therefore, exposed to discharge fluid pressure. In certain examples, end sections of the second groove 162 extend axially between the circumferential section and the drum 136.

Discharge fluid flows along the second groove 162 from the first end 161 to the second end 163. Absent the second groove 162, fluid would leak across the first land 138 from the inlet region 110 towards the drum 136, thereby resulting in a pressure gradient spanning the first land 138. The addition of the second groove 162 confines the fluid leak, and hence the pressure gradient, to the second axial region 166. The second groove 162 reduces a pressure gradient across the first axial region 164. Fluid pressure does not vary greatly across the first axial region 164 because the fluid pressure at the second groove 162 is the same as the fluid pressure at the drum 136. Furthermore, the fluid leaking across the second axial region 166 is limited by the dimensions (e.g., transverse cross-sectional area) of the second groove 162. Because fluid is not leaking (at least not significantly) across the first axial region 164 to the second groove 162, the fluid that will leak across the second axial region 166 stems from the second groove 162. Accordingly, the amount of fluid leaking over the second axial region 166 is limited to the amount that flows through the second groove 162.

The discharge pressure communicated along the outer channel 148 applies a radial load on the movable bearing 124a, 124b towards the outer housing 116. This radial load pushes a first circumferential section of the first land 138 towards the outer housing 116. A second circumferential section of the first land 138, which is located circumferentially opposite the first section, is exposed to inlet pressure. In certain examples, the second groove 162 is disposed at the second circumferential section of the first land 138 to counteract the radial load by allowing discharge pressure to be applied to at least a portion of the second circumferential section. Counteracting the radial load applied to the first circumferential section may result in less friction between the second circumferential section and the outer housing 116, which facilitates axial movement of the bearing 124a, 124b.

Aspects of the Disclosure

1. A method for controlling an area of a pressure gradient on a movable bearing, the bearing defining a bore extending along a length of the bearing between opposite first and second axial end faces of the bearing, the bearing also defining a circumferential land disposed between the first axial end face and a radially outwardly facing drum exposed to discharge pressure, the method comprising:
   identifying a surface of the bearing, the surface extending from a first edge to a high pressure region, the high pressure region being exposed to a first pressure, the first edge being exposed to a second pressure that is lower than the first pressure at the high pressure region so that a pressure gradient extends along the surface between the first edge and the high pressure region;
   selecting a portion of the surface to which to limit the pressure gradient including defining a boundary of the portion at a location between the first edge and the high pressure region, the portion extending from the first edge to the boundary; and
   providing a groove into the surface along the boundary, the groove being is communication with the high pressure region to provide the first pressure to the boundary.

2. The method of claim 1, wherein identifying the surface of the bearing includes identifying the first axial end face of the bearing, wherein the first edge forms an inner circumferential edge of the bearing surrounding the bore, and wherein the high pressure region is disposed at an outer circumferential edge of the bearing.

3. The method of claim 2, wherein the boundary is disposed radially closer to the first edge than to the outer circumferential edge of the bearing.

4. The method of claim 2, wherein providing the groove includes providing the groove along less than a full circumference of the axial end face.

5. The method of claim 4, wherein the groove terminates before reaching a low pressure region at the outer circumferential edge of the bearing.

6. The method of claim 2, wherein providing the groove includes providing the groove along a majority of a circumference of the axial end face.

7. The method of claim 1, wherein identifying the surface of the bearing includes identifying the circumferential surface of the bearing, wherein the first edge transitions between the circumferential surface and the first axial end face, and wherein the high pressure region is disposed at the drum.

8. The method of claim 7, wherein the boundary is disposed closer to the first edge than to the drum.

9. The method of claim 7, wherein the boundary is defined at a common distance from the first edge along at least a portion of the circumference of the bearing.

10. The method of claim 7, wherein the groove extends along less than a full circumference of the bearing.

11. The method of claim 10, wherein the groove extends along less than half of the full circumference of the bearing.

12. A gear stage of a pump comprising:
- a housing defining a gear chamber, the housing defining an inlet and an outlet in fluid communication with the gear chamber;
- a gear arrangement disposed within the gear chamber configured to drive fluid from the inlet to the outlet, the gear arrangement including at least a gear rotatable about an axis of rotation;
- a journal coupled to the gear, the journal extending along the first axis and being configured to drive rotation of the gear about the axis of rotation;
- a fixed bearing at a first axial side of the gear for radially supporting the journal relative to the housing such that the journal is rotatable about the axis of rotation relative to the housing; and
- an axially-movable bearing at an opposite second axial side of the gear for radially supporting the journal relative to the housing such that the journal is rotatable about the axis of rotation relative to the housing, the axially-movable bearing defining a through-bore for receiving the journal, the through-bore extending between a first axial end and a second axial end of the axially-movable bearing, the first axial end facing the second axial side of the gear and the second axial end facing away from the gear, the axially-movable bearing being axially movable along axis of rotation within the journal toward and away from the gear, the axially-movable bearing being rotationally fixed relative to the housing, the through-bore being in fluid pressure communication with inlet pressure corresponding to the inlet of the housing, and wherein discharge pressure corresponding to the outlet of the housing acts on the second axial end of the axially-movable bearing to cause the first axial end of the axially-movable bearing to bear axially against the second axial side of the gear;

wherein:
a. the first axial end of the movable bearing defines an axial end face configured to contact the second axial side of the gear, the axial end face extending radially outwardly from the through-bore toward an outer circumference of the axial end face, the axial end face defining a first circumferential groove, the first circumferential groove dividing the axial end face into an inner region extending radially between the first circumferential groove and the through-bore and an outer region extending radially between the first circumferential groove and the outer circumference, the outer region being exposed to the discharge pressure, the first circumferential groove being in fluid communication with the discharge pressure such that a pressure gradient radially across the outer region is minimized, the inner region having a pressure differential between the discharge pressure at the first circumferential groove and the inlet pressure at the through-bore; and/or b. the axially-movable bearing includes an outer circumferential portion defining an outer circumferential boundary that extends axially between the first and second axial ends of axially-movable bearing, the outer circumferential portion including an outer land for supporting the journal radially relative to the housing, the outer land having a first dimension that extends circumferentially about the axis of rotation and a second dimension that extends axially along the axis of rotation, the outer circumferential portion defining a drum portion disposed axially between the outer land and the second axial end of the axially-movable bearing, the drum being exposed to the discharge pressure, the second dimension of the outer land extending between the drum portion and an inlet pressure region adjacent the first axial end of the axially-movable bearing, the outer land defining a second circumferential groove extending circumferentially along the outer land to divide the outer land into a first axial region adjacent the drum region and a second axial region adjacent the inlet pressure region, the second circumferential groove being in fluid communication with the discharge pressure from the drum portion to minimize a pressure gradient across the first axial region, the second axial region having a pressure differential between the discharge pressure at the second circumferential groove and the inlet pressure at the inlet pressure region.

13. The gear stage of claim 12, wherein the first groove extends over less than a full circumference of the first axial end face.

14. The gear stage of claim 12, wherein the first groove is disposed closer to through-bore than to an outer circumferential edge of the first axial end face.

15. The gear stage of claim 14, wherein the first groove is disposed at a radial position on the first axial end face that corresponds to roots of teeth of the gear.

16. The gear stage of claim 12, wherein the second groove extends over less than a full circumference of the outer circumferential portion.

17. The gear stage of claim 12, wherein the second groove is disposed closer to the first axial end face than to the drum.

18. The gear stage of any of claims 12-17, further comprising:
- a second journal extending along the gear chamber of the housing parallel to the journal, the second journal driving another portion of the gear arrangement;
- a second fixed bearing mounted over the second journal at the first side of the gear arrangement; and
- a second movable bearing mounted over the second journal at the second side of the gear arrangement.

19. The gear stage of claim 18, wherein the second movable bearing is a mirror image of the movable bearing.

20. A journal bearing comprising:
- a body defining a through-bore extending along a longitudinal axis between a first axial end and a second axial end of the body, the through-bore having a portion at the first axial end that is configured to be exposed to a pump inlet pressure;

an axial end face disposed at the first axial end, the axial end face extending radially outwardly from the through-bore toward an outer circumference of the axial end face, the axial end face defining a first circumferential groove, the first circumferential groove dividing the axial end face into an inner region extending radially between the first circumferential groove and the through-bore and an outer region extending radially between the first circumferential groove and the outer circumference, the outer region being configured to be exposed to a pump discharge pressure, the first circumferential groove being in fluid communication with the pump discharge pressure such that a radial pressure gradient across the outer region is reduced, the inner region having a pressure gradient between the pump discharge pressure at the first circumferential groove and the pump inlet pressure at the through-bore; and an outer circumferential portion extending axially between the first and second axial ends, the outer circumferential portion defining an outer circumferential boundary that extends axially between the first and second axial ends, the outer circumferential portion including an outer land having a first dimension that extends circumferentially about the longitudinal axis and a second dimension that extends axially along the longitudinal axis, the outer circumferential portion defining a drum portion disposed axially between the outer land and the second axial end, the drum being configured to be exposed to the pump discharge pressure, the second dimension of the outer land extending between the drum and the first axial end of the axially-movable bearing, the outer land defining a second circumferential groove extending circumferentially along the outer land to divide the outer land into a first axial region adjacent the drum and a second axial region adjacent the first axial end, the second circumferential groove being in fluid communication with the drum to reduce a pressure gradient across the first axial region.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A gear stage of a pump comprising:
a housing defining a gear chamber, the housing defining an inlet and an outlet in fluid communication with the gear chamber;
a gear arrangement disposed within the gear chamber configured to drive fluid from the inlet to the outlet, the gear arrangement including at least a gear rotatable about an axis of rotation;
a journal coupled to the gear, the journal extending along the axis of rotation and being configured to drive rotation of the gear about the axis of rotation;
a fixed bearing at a first axial side of the gear for radially supporting the journal relative to the housing such that the journal is rotatable about the axis of rotation relative to the housing; and
an axially-movable bearing at an opposite second axial side of the gear for radially supporting the journal relative to the housing such that the journal is rotatable about the axis of rotation relative to the housing, the axially-movable bearing defining a through-bore for receiving the journal, the through-bore extending between a first axial end and a second axial end of the axially-movable bearing, the first axial end facing the second axial side of the gear and the second axial end facing away from the gear, the axially-movable bearing being axially movable along the axis of rotation within the journal toward and away from the gear, the axially-movable bearing being rotationally fixed relative to the housing, the through-bore being in fluid pressure communication with inlet pressure corresponding to the inlet of the housing, and wherein the discharge pressure corresponding to the outlet of the housing acts on the second axial end of the axially-movable bearing to cause the first axial end of the axially-movable bearing to bear axially against the second axial side of the gear;
wherein:
a. the first axial end of the axially-movable bearing defines an axial end face configured to contact the second axial side of the gear, the axial end face extending radially outwardly from the through-bore toward an outer circumference of the axial end face, the axial end face defining a first circumferential groove, the first circumferential groove dividing the axial end face into an inner region extending radially between the first circumferential groove and the through-bore and an outer region extending radially between the first circumferential groove and the outer circumference, the outer region being exposed to the discharge pressure, the first circumferential groove being in fluid communication with the discharge pressure such that a pressure gradient radially across the outer region is minimized, the inner region having a pressure differential between the discharge pressure at the first circumferential groove and the inlet pressure at the through-bore; and
b. the axially-movable bearing includes an outer circumferential portion defining an outer circumferential boundary that extends axially between the first and second axial ends of the axially-movable bearing, the outer circumferential portion including an outer land for supporting the journal radially relative to the housing, the outer land having a first dimension that extends circumferentially about the axis of rotation and a second dimension that extends axially along the axis of rotation, the outer circumferential portion defining a drum portion disposed axially between the outer land and the second axial end of the axially-movable bearing, the drum portion being exposed to the discharge pressure, the second dimension of the outer land extending between the drum portion and an inlet pressure region adjacent the first axial end of the axially-movable bearing, the outer land defining a second circumferential groove extending circumferentially along the outer land to divide the outer land into a first axial region adjacent the drum portion and a second axial region adjacent the inlet pressure region, the second circumferential groove being in direct fluid communication with from the drum portion to minimize a pressure gradient across the first axial region, the second axial region having a pressure differential between the discharge pressure at the second circumferential groove and the inlet pressure at the inlet pressure region; and
wherein the first and second circumferential grooves each extend over less than a full circumference of the axially-movable bearing, and wherein the first and second circumferential grooves are circumferentially offset from one another and positioned on opposite sides of the axis of rotation.

2. The gear stage of claim 1, wherein the outer circumferential portion of the axially-movable bearing defines an outer channel that extends circumferentially about the outer circumferential portion in general alignment with the first circumferential groove, the outer channel being in fluid communication with discharge pressure.

3. The gear stage of claim 1, wherein the first circumferential groove is disposed closer to the through-bore than to an outer circumferential edge of the axial end face.

4. The gear stage of claim 3, wherein the first circumferential groove is disposed at a radial position on the axial end face that corresponds to roots of teeth of the gear.

5. The gear stage of claim 1, wherein the second circumferential groove is disposed closer to the first axial end face than to the drum portion.

6. The gear stage of claim 1, wherein the journal is a first journal, wherein the fixed bearing is a first fixed bearing, wherein the axially-movable bearing is a first axially-movable bearing, wherein the gear stage further comprises:
a second journal extending along the gear chamber of the housing parallel to the first journal, the second journal driving another portion of the gear arrangement;
a second fixed bearing mounted over the second journal at the first axial side of the gear arrangement; and
a second axially-movable bearing mounted over the second journal at the second axial side of the gear arrangement.

7. The gear stage of claim 6, wherein the second axially-movable bearing is a mirror image of the first axially-movable bearing.

8. An axially-movable bearing comprising:
a body defining a through-bore extending along a longitudinal axis between a first axial end and a second axial end of the body, the through-bore having a portion at the first axial end that is configured to be exposed to a pump inlet pressure;
an axial end face disposed at the first axial end, the axial end face extending radially outwardly from the through-bore toward an outer circumference of the axial end face, the axial end face defining a first circumferential groove, the first circumferential groove dividing the axial end face into an inner region extending radially between the first circumferential groove and the through-bore and an outer region extending radially between the first circumferential groove and the outer circumference, the outer region being configured to be exposed to a pump discharge pressure, the first circumferential groove being in fluid communication with the pump discharge pressure such that a radial pressure gradient across the outer region is reduced, the inner region having a pressure gradient between the pump discharge pressure at the first circumferential groove and the pump inlet pressure at the through-bore; and
an outer circumferential portion extending axially between the first and second axial ends, the outer circumferential portion defining an outer circumferential boundary that extends axially between the first and second axial ends, the outer circumferential portion including an outer land having a first dimension that extends circumferentially about the longitudinal axis and a second dimension that extends axially along the longitudinal axis, the outer circumferential portion defining a drum portion disposed axially between the outer land and the second axial end, the drum portion being configured to be exposed to the pump discharge pressure, the second dimension of the outer land extending between the drum portion and the first axial end of the axially-movable bearing, the outer land defining a second circumferential groove extending circumferentially along the outer land to divide the outer land into a first axial region adjacent the drum portion and a second axial region adjacent the first axial end, the second circumferential groove being in direct fluid communication with the drum portion to reduce a pressure gradient across the first axial region; and
wherein the first and second circumferential grooves each extend over less than a full circumference of the axially-movable bearing, and wherein the first and second circumferential grooves are circumferentially offset from one another and positioned on opposite sides of the longitudinal axis.

9. A gear stage of a pump comprising:
a housing defining a gear chamber, the housing defining an inlet and an outlet in fluid communication with the gear chamber;
a gear arrangement disposed within the gear chamber configured to drive fluid from the inlet to the outlet, the gear arrangement including at least a gear rotatable about an axis of rotation;
a journal coupled to the gear, the journal extending along the axis of rotation and being configured to drive rotation of the gear about the axis of rotation;
a fixed bearing at a first axial side of the gear for radially supporting the journal relative to the housing such that the journal is rotatable about the axis of rotation relative to the housing; and
an axially-movable bearing at an opposite second axial side of the gear for radially supporting the journal relative to the housing such that the journal is rotatable about the axis of rotation relative to the housing, the axially-movable bearing defining a through-bore for receiving the journal, the through-bore extending between a first axial end and a second axial end of the axially-movable bearing, the first axial end facing the second axial side of the gear and the second axial end facing away from the gear, the axially-movable bearing being axially movable along the axis of rotation within the journal toward and away from the gear, the axially-movable bearing being rotationally fixed relative to the housing, the through-bore being in fluid pressure communication with inlet pressure corresponding to the inlet of the housing, and wherein the discharge pressure corresponding to the outlet of the housing acts on the second axial end of the axially-movable bearing to cause the first axial end of the axially-movable bearing to bear axially against the second axial side of the gear;
wherein the axially-movable bearing includes an outer circumferential portion defining an outer circumferential boundary that extends axially between the first and second axial ends of the axially-movable bearing, the outer circumferential portion including an outer land for supporting the journal radially relative to the housing, the outer land having a first dimension that extends circumferentially about the axis of rotation and a second dimension that extends axially along the axis of rotation, the outer circumferential portion defining a drum portion disposed axially between the outer land and the second axial end of the axially-movable bearing, the drum portion being exposed to the discharge pressure, the second dimension of the outer land extending between the drum portion and an inlet pressure region adjacent the first axial end of the axially-movable bearing, the outer land defining a circumferential groove extending circumferentially along the outer land to divide the outer land into a first axial region adjacent the drum portion and a second axial region adjacent the inlet pressure region, the circumferential groove being in direct fluid communication with the discharge pressure from the drum portion to minimize a pressure gradient across the first axial region, the second axial region having a pressure differential between the discharge pressure at the circumferential groove and the inlet pressure at the inlet pressure region;

wherein the inlet pressure region is defined in part by a notch at the first axial end of the axially-movable bearing, and the circumferential groove has a stepped configuration that follows a shape of the notch.

10. The gear stage of claim 9, wherein the circumferential groove has opposite ends both in direct fluid communication with discharge pressure.

11. The gear stage of claim 10, wherein the circumferential groove includes end portions that extend axially along the axis of rotation to connect with discharge pressure.

12. The gear stage of claim 11, wherein the outer land is a first outer land positioned adjacent to the first axial end of the axially-movable bearing, wherein the outer circumferential portion includes a second outer land axially offset from the first outer land and positioned adjacent to the second axial end of the axially-movable bearing, wherein the drum portion defines a recess between the first and second lands that is at discharge pressure, and wherein the end portions of the circumferential groove provide fluid communication with the recess.

* * * * *